United States Patent
Dorwin

(10) Patent No.: US 9,326,012 B1
(45) Date of Patent: Apr. 26, 2016

(54) DYNAMICALLY CHANGING STREAM QUALITY WHEN USER IS UNLIKELY TO NOTICE TO CONSERVE RESOURCES

(75) Inventor: David Kimbal Dorwin, Kirkland, WA (US)

(73) Assignee: Google Inc., Mountain View, CA (US)

( * ) Notice: Subject to any disclaimer, the term of this patent is extended or adjusted under 35 U.S.C. 154(b) by 501 days.

(21) Appl. No.: 13/538,908

(22) Filed: Jun. 29, 2012

Related U.S. Application Data

(60) Provisional application No. 61/569,755, filed on Dec. 12, 2011.

(51) Int. Cl.
*G06F 15/16* (2006.01)
*H04N 21/24* (2011.01)
*H04L 29/06* (2006.01)

(52) U.S. Cl.
CPC ............... *H04N 21/24* (2013.01); *H04L 65/80* (2013.01)

(58) Field of Classification Search
None
See application file for complete search history.

(56) References Cited

U.S. PATENT DOCUMENTS

| | | | |
|---|---|---|---|
| 4,535,355 A | 8/1985 | Arn et al. |
| 4,694,489 A | 9/1987 | Frederiksen |
| 5,067,035 A | 11/1991 | Kudelski et al. |
| 5,134,656 A | 7/1992 | Kudelski |
| 5,144,663 A | 9/1992 | Kudelski et al. |
| 5,191,611 A | 3/1993 | Lang |
| 5,339,413 A | 8/1994 | Koval et al. |
| 5,375,168 A | 12/1994 | Kudelski |
| 5,392,351 A | 2/1995 | Hasebe et al. |
| 5,487,167 A | 1/1996 | Dinallo et al. |
| 5,539,450 A | 7/1996 | Handelman |
| 5,590,200 A | 12/1996 | Nachman et al. |
| 5,592,212 A | 1/1997 | Handelman |
| 5,621,799 A | 4/1997 | Katta et al. |
| 5,640,546 A | 6/1997 | Gopinath et al. |
| 5,666,412 A | 9/1997 | Handelman et al. |
| 5,684,876 A | 11/1997 | Pinder et al. |
| 5,758,257 A | 5/1998 | Herz et al. |
| 5,774,527 A | 6/1998 | Handelman et al. |

(Continued)

FOREIGN PATENT DOCUMENTS

| | | | |
|---|---|---|---|
| EP | 0658054 A2 | 6/1995 |
| EP | 0714204 A2 | 5/1996 |

(Continued)

OTHER PUBLICATIONS

"Digital rights management," Wikipedia, the free encyclopedia, last modified Mar. 30, 2012, 30 pages http://en.wikipedia.org/w/index.php?title=Digital_rights_management&printable=yes.

(Continued)

*Primary Examiner* — Mohamed Ibrahim
(74) *Attorney, Agent, or Firm* — Byrne Poh LLP

(57) ABSTRACT

A computing device may be configured to automatically change at least a quality, display, video, and/or audio features for a content stream when a user is unlikely to notice such changes. When the user requests play of a stream of content, a determination may be made regarding a level of presence of the user and a configuration of the computing device. A level of quality is selected based on the determined level of presence/device configuration. At least one content stream is prepared and played using the selected level of quality. When a change in the level of presence of the user/or device configuration is detected, the at least one content stream can selectively be changed automatically.

20 Claims, 5 Drawing Sheets

(56) References Cited

U.S. PATENT DOCUMENTS

| | | |
|---|---|---|
| 5,774,546 A | 6/1998 | Handelman et al. |
| 5,799,089 A | 8/1998 | Kuhn et al. |
| 5,805,705 A | 9/1998 | Gray et al. |
| 5,870,474 A | 2/1999 | Wasilewski et al. |
| 5,878,134 A | 3/1999 | Handelman et al. |
| 5,883,957 A | 3/1999 | Moline et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,625 A | 7/1999 | Davies |
| 5,920,861 A | 7/1999 | Hall et al. |
| 5,922,208 A | 7/1999 | Demmers |
| 5,923,666 A | 7/1999 | Gledhill et al. |
| 5,933,498 A | 8/1999 | Schneck et al. |
| 5,939,975 A | 8/1999 | Tsuria et al. |
| 5,943,422 A | 8/1999 | Van Wie et al. |
| 5,949,876 A | 9/1999 | Ginter et al. |
| 5,974,549 A | 10/1999 | Golan |
| 5,982,891 A | 11/1999 | Ginter et al. |
| 5,991,399 A | 11/1999 | Graunke et al. |
| 6,009,116 A | 12/1999 | Bednarek et al. |
| 6,009,401 A | 12/1999 | Horstmann |
| 6,009,525 A | 12/1999 | Horstmann |
| 6,021,197 A | 2/2000 | von Willich et al. |
| 6,035,037 A | 3/2000 | Chaney |
| 6,038,433 A | 3/2000 | Vegt |
| 6,049,671 A | 4/2000 | Slivka et al. |
| 6,055,503 A | 4/2000 | Horstmann |
| 6,073,256 A | 6/2000 | Sesma |
| 6,112,181 A | 8/2000 | Shear et al. |
| 6,138,119 A | 10/2000 | Hall et al. |
| 6,141,753 A | 10/2000 | Zhao et al. |
| 6,157,721 A | 12/2000 | Shear et al. |
| 6,160,891 A | 12/2000 | Al-Salqan |
| 6,178,242 B1 | 1/2001 | Tsuria |
| 6,185,683 B1 | 2/2001 | Ginter et al. |
| 6,189,097 B1 | 2/2001 | Tycksen, Jr. et al. |
| 6,191,782 B1 | 2/2001 | Mori et al. |
| 6,226,618 B1 | 5/2001 | Downs et al. |
| 6,226,794 B1 | 5/2001 | Anderson, Jr. et al. |
| 6,237,786 B1 | 5/2001 | Ginter et al. |
| 6,240,185 B1 | 5/2001 | Van Wie et al. |
| 6,247,950 B1 | 6/2001 | Hallam et al. |
| 6,253,193 B1 | 6/2001 | Ginter et al. |
| 6,256,668 B1 | 7/2001 | Slivka et al. |
| 6,272,636 B1 | 8/2001 | Neville et al. |
| 6,285,985 B1 | 9/2001 | Horstmann |
| 6,292,569 B1 | 9/2001 | Shear et al. |
| 6,298,441 B1 | 10/2001 | Handelman et al. |
| 6,311,221 B1 | 10/2001 | Raz et al. |
| 6,314,409 B2 | 11/2001 | Schneck et al. |
| 6,314,572 B1 | 11/2001 | LaRocca et al. |
| 6,334,213 B1 | 12/2001 | Li |
| 6,363,488 B1 | 3/2002 | Ginter et al. |
| 6,385,596 B1 | 5/2002 | Wiser et al. |
| 6,389,402 B1 | 5/2002 | Ginter et al. |
| 6,405,369 B1 | 6/2002 | Tsuria |
| 6,409,080 B2 | 6/2002 | Kawagishi |
| 6,409,089 B1 | 6/2002 | Eskicioglu |
| 6,415,031 B1 | 7/2002 | Colligan et al. |
| 6,427,140 B1 | 7/2002 | Ginter et al. |
| 6,449,367 B2 | 9/2002 | Van Wie et al. |
| 6,449,719 B1 | 9/2002 | Baker |
| 6,459,427 B1 | 10/2002 | Mao et al. |
| 6,460,023 B1 | 10/2002 | Bean et al. |
| 6,466,670 B1 | 10/2002 | Tsuria et al. |
| 6,505,299 B1 | 1/2003 | Zeng et al. |
| 6,587,561 B1 | 7/2003 | Sered et al. |
| 6,618,484 B1 | 9/2003 | Van Wie et al. |
| 6,629,243 B1 | 9/2003 | Kleinman et al. |
| 6,633,918 B2 | 10/2003 | Agarwal et al. |
| 6,634,028 B2 | 10/2003 | Handelman |
| 6,640,304 B2 | 10/2003 | Ginter et al. |
| 6,651,170 B1 | 11/2003 | Rix |
| 6,654,420 B1 | 11/2003 | Snook |
| 6,654,423 B2 | 11/2003 | Jeong et al. |
| 6,658,568 B1 | 12/2003 | Ginter et al. |
| 6,668,325 B1 | 12/2003 | Collberg et al. |
| 6,792,113 B1 | 9/2004 | Ansell et al. |
| 7,007,170 B2 | 2/2006 | Morten |
| 7,165,175 B1 | 1/2007 | Kollmyer et al. |
| 7,356,143 B2 | 4/2008 | Morten |
| 7,363,384 B2 * | 4/2008 | Chatani et al. ............... 709/232 |
| 7,578,002 B2 | 8/2009 | Risan et al. |
| 7,640,435 B2 | 12/2009 | Morten |
| 7,805,616 B1 | 9/2010 | Mohammed et al. |
| 7,817,608 B2 | 10/2010 | Rassool et al. |
| 7,827,613 B2 | 11/2010 | Koved et al. |
| 7,953,882 B2 | 5/2011 | Shukla et al. |
| 8,560,642 B2 | 10/2013 | Pantos et al. |
| 2002/0001385 A1 | 1/2002 | Kawada et al. |
| 2002/0015498 A1 | 2/2002 | Houlberg et al. |
| 2002/0021761 A1 | 2/2002 | Zhang et al. |
| 2002/0021805 A1 | 2/2002 | Schumann et al. |
| 2002/0049679 A1 | 4/2002 | Russell et al. |
| 2002/0089410 A1 | 7/2002 | Janiak et al. |
| 2002/0104004 A1 | 8/2002 | Couillard |
| 2002/0107803 A1 | 8/2002 | Lisanke et al. |
| 2002/0141582 A1 | 10/2002 | Kocher et al. |
| 2003/0007568 A1 | 1/2003 | Hamery et al. |
| 2003/0046568 A1 | 3/2003 | Riddick et al. |
| 2004/0031856 A1 | 2/2004 | Atsmon et al. |
| 2004/0054909 A1 | 3/2004 | Serkowski et al. |
| 2004/0117500 A1 | 6/2004 | Lindholm et al. |
| 2004/0151315 A1 | 8/2004 | Kim |
| 2004/0184616 A1 | 9/2004 | Morten |
| 2004/0230806 A1 | 11/2004 | Lisanke |
| 2005/0027871 A1 | 2/2005 | Bradley et al. |
| 2005/0066353 A1 | 3/2005 | Fransdonk |
| 2005/0125358 A1 | 6/2005 | Levin et al. |
| 2005/0193205 A1 | 9/2005 | Jacobs et al. |
| 2005/0273862 A1 | 12/2005 | Benaloh et al. |
| 2005/0281531 A1 * | 12/2005 | Unmehopa ..................... 386/46 |
| 2006/0020811 A1 | 1/2006 | Tan |
| 2006/0212363 A1 | 9/2006 | Peinado et al. |
| 2006/0280150 A1 | 12/2006 | Jha et al. |
| 2007/0005795 A1 | 1/2007 | Gonzalez |
| 2007/0136372 A1 * | 6/2007 | Proctor et al. ............. 707/104.1 |
| 2007/0160208 A1 | 7/2007 | MacLean et al. |
| 2007/0204300 A1 | 8/2007 | Markley et al. |
| 2007/0209005 A1 | 9/2007 | Shaver et al. |
| 2007/0219917 A1 | 9/2007 | Liu et al. |
| 2007/0294170 A1 | 12/2007 | Vantalon et al. |
| 2008/0027871 A1 | 1/2008 | Seo |
| 2008/0052641 A1 | 2/2008 | Brown et al. |
| 2008/0137848 A1 | 6/2008 | Kocher et al. |
| 2008/0147671 A1 | 6/2008 | Simon et al. |
| 2008/0155586 A1 | 6/2008 | Yang et al. |
| 2008/0155673 A1 | 6/2008 | Jung et al. |
| 2008/0267399 A1 | 10/2008 | Medvinsky et al. |
| 2008/0288611 A1 | 11/2008 | Toyomura et al. |
| 2008/0307454 A1 | 12/2008 | Ahanger et al. |
| 2008/0313264 A1 | 12/2008 | Pestoni |
| 2009/0007198 A1 | 1/2009 | Lavender et al. |
| 2009/0031408 A1 | 1/2009 | Thom et al. |
| 2009/0044008 A1 | 2/2009 | Lim |
| 2009/0183001 A1 | 7/2009 | Lu et al. |
| 2009/0197238 A1 | 8/2009 | Moffatt et al. |
| 2009/0208016 A1 | 8/2009 | Choi et al. |
| 2009/0249426 A1 | 10/2009 | Aoki et al. |
| 2010/0023760 A1 | 1/2010 | Lee et al. |
| 2010/0027974 A1 | 2/2010 | Ansari |
| 2010/0145794 A1 | 6/2010 | Barger et al. |
| 2010/0180289 A1 | 7/2010 | Barsook et al. |
| 2010/0199104 A1 | 8/2010 | Van Rijnswou |
| 2010/0211776 A1 | 8/2010 | Gunaseelan et al. |
| 2010/0235820 A1 | 9/2010 | Khouzam et al. |
| 2010/0242097 A1 | 9/2010 | Hotes et al. |
| 2010/0250532 A1 | 9/2010 | Soroushian et al. |
| 2010/0299701 A1 | 11/2010 | Liu et al. |
| 2011/0055904 A1 | 3/2011 | Tsutsumi |
| 2011/0069936 A1 | 3/2011 | Johnson et al. |
| 2011/0179283 A1 | 7/2011 | Thom et al. |

(56) References Cited

U.S. PATENT DOCUMENTS

| | | | |
|---|---|---|---|
| 2011/0225417 | A1 | 9/2011 | Maharajh et al. |
| 2011/0251992 | A1 | 10/2011 | Bethlehem et al. |
| 2011/0305273 | A1 | 12/2011 | He et al. |
| 2011/0314284 | A1 | 12/2011 | Chou |
| 2012/0066494 | A1 | 3/2012 | Lee et al. |
| 2012/0079578 | A1 | 3/2012 | Dachiraju et al. |
| 2012/0114118 | A1 | 5/2012 | Verma |
| 2012/0117183 | A1 | 5/2012 | Wong et al. |
| 2012/0124604 | A1* | 5/2012 | Small et al. ............. 725/12 |
| 2012/0173884 | A1 | 7/2012 | Patil |
| 2012/0317414 | A1 | 12/2012 | Glover |
| 2012/0331293 | A1 | 12/2012 | Ma et al. |
| 2013/0072126 | A1 | 3/2013 | Topaltzas et al. |
| 2013/0097302 | A9 | 4/2013 | Khedouri et al. |
| 2013/0108245 | A1 | 5/2013 | Yin et al. |
| 2013/0145406 | A1 | 6/2013 | Baskaran et al. |
| 2013/0174222 | A1 | 7/2013 | Ogle |
| 2013/0195204 | A1* | 8/2013 | Reznik et al. ......... 375/240.26 |
| 2014/0032350 | A1 | 1/2014 | Biswas et al. |
| 2014/0130073 | A1* | 5/2014 | Yu et al. ............... 725/14 |

FOREIGN PATENT DOCUMENTS

| | | | | |
|---|---|---|---|---|
| EP | 0852445 | A2 | 7/1998 | |
| EP | 0886409 | A2 | 12/1998 | |
| EP | 1134977 | A1 | 9/2001 | |
| EP | 1246463 | A2 | 10/2002 | |
| EP | 1843592 | A1 * | 10/2007 | ....... H04N 21/44218 |
| JP | 03203432 | A | 9/1991 | |
| JP | 08335040 | A | 12/1996 | |
| JP | 10336128 | A | 12/1998 | |
| JP | 11175475 | A | 7/1999 | |
| JP | 2000022680 | A | 1/2000 | |
| JP | 2000196585 | A | 7/2000 | |
| JP | 2000293945 | A | 10/2000 | |
| JP | 2001251599 | A | 9/2001 | |
| WO | 96/06504 | A1 | 2/1996 | |
| WO | 96/32702 | A1 | 10/1996 | |
| WO | 99/21364 | A1 | 4/1999 | |
| WO | 99/28842 | A1 | 6/1999 | |
| WO | 99/30499 | A1 | 6/1999 | |
| WO | 99/54453 | A1 | 10/1999 | |
| WO | 01/35571 | A1 | 5/2001 | |
| WO | 01/93212 | A2 | 12/2001 | |
| WO | 02/21761 | A2 | 3/2002 | |
| WO | 2004/002112 | A1 | 12/2003 | |

OTHER PUBLICATIONS

"Establishing Interconnectivity among Various Makers' Products through Standardization of VOD Protocol", NTT Corporation Press Release, Sep. 27, 2002 http://www.ntt.co.jp/news/news02e/0209/020927.html.
"High-bandwidth Digital Content Protection," Wikipedia, the free encyclopedia, last modified Nov. 14, 2012, 7 pages http://en.wikipedia.org/w/index.php?title=High-bandwidth_Digital_Content_Protection&printable=yes.
"Intelligent Systems for Finance and Business," Goonatilake, S. et al., eds., Chapters 2-10, 1995, pp. 31-173.
"Irdeto Access and Optibase create Strategic Alliance", Press Release, Irdeto Access, Dec. 14, 2000 pp. 1-4 http://www.irdetoaccess.com/press/0000041.htm.
"Irdeto Access and Optibase create Strategic Alliance", Press Release, Optibase, Dec. 14, 2000, pp. 1-2 http://www.optibase.com/html/news/December_14_2000.html.
"PlayReady," Wikipedia, the free encyclopedia, last modified Jan. 30, 2012, 2 pages http://en.wikipedia.org/w/index.php?title=PlayReady&printable=yes.
"Scalable Video Coding," Wikipedia, the free encyclopedia, last modified Sep. 10, 2012, 4 pages http://en.wikipedia.org/w/index.php?title=Scalable_Video_Coding&printable=yes.
"UltraViolet (system)," Wikipedia, the free encyclopedia, last modified Feb. 20, 2012, 5 pages http://en.wikipedia.org/w/index.php?title=UltraViolet_(system)&printable=yes.
"What is HDCP (high definition copy protocol)?" Digital Connection, 2005, 2 pages http://www.digitalconnection.com/FAQ/HDTV_12.asp.
Balthrop, J. et al., "Coverage and Generalization in an Artificial Immune System", Proceedings of Genetic and Evolutionary Computation Conference (GECCO), 2002, pp. 1-8.
Blumenfeld, S. M., "Streaming Media—System Security," Broadcast Engineering Magazine, Oct. 2001, pp. 1-2.
Canadian Examiner Report for Application No. 2,559,323 mailed May 6, 2008, 3 pages.
Cheng, H. C. H., "Partial Encryption for Image and Video Communication", Department of Computing Science, University of Alberta, Fall 1998, pp. 1-87.
Cheng, H. et al., "Partial Encryption of Compressed Images and Videos", IEEE Transactions on Signal Processing, vol. 48, No. 8, Aug. 2000, pp. 2439-2451.
Deitcher, D., "Secure Implementations of Content Protection (DRM) Schemes on Consumer Electronic Devices," Discretix, White Paper, May 2011, 17 pages.
Eskicioglu, A. M. et al., "An Overview of Multimedia Content Protection in Consumer Electronics Devices", SP:IC, vol. 16 No. 7, Apr. 2001, pp. 681-699.
Ferrill, E. et al., "A Survey of Digital Watermarking", Feb. 25, 1999, 15 pages http://elizabeth.ferrill.com/papers/watermarking.pdf.
Forrest, S., "Research Projects," Dec. 2, 2003, pp. 1-3 http://www.cs.unm.edu/.about.forrest/projects.html.
Goodman, J. et al., "Low Power Scalable Encryption for Wireless Systems", Wireless Networks, No. 4, 1998, pp. 55-70.
Griwodz, C. et al., "Protecting VoD the Easier Way", ACM Multimedia, Bristol, UK, Jan. 1998, pp. 21-28.
Griwodz, C., "Video Protection by Partial Content Corruption", Multimedia and Security Workshop at ACM Multimedia, Bristol, UK, Sep. 1998, pp. 1-5.
Hunter, J., et al., "A Review of Video Streaming Over the Internet", DSTC Technical Report TR97-10, Aug. 1997, pp. 1-28.
International Search Report and Written Opinion for International Patent Application No. PCT/US07/62055 mailed Sep. 11, 2007.
Kirovski, D. et al, "Digital Rights Management for Digital Cinema", Proceedings of the SPIE, Bellingham, VA, vol. 4472, Jul. 31, 2001, p. 105-120.
Office Action for European Patent Application No. 05250968.4 mailed Jan. 26, 2006.
Official Communication for Chinese Patent Application No. 2004800071571 mailed Apr. 13, 2007.
Official Communication for European Patent Application No. 04757582.4 mailed May 22, 2007.
Omneon Video Networks Product Announcement, "Broadband Streaming—Omneon and BSkyB", T6-1006-1, created 2002, pp. 1-4.
Schulzrinne, H., et al., "Real Time Streaming Protocol (RTSP)," RFC 2326, Apr. 1998, pp. 1-86.
Schulzrinne, H., et al., "RTP: A Transport Protocol for Real-Time Applications", RFC 1889, Jan. 1996, pp. 1-75.
Search Report for European Patent Application No. 05250968.4 mailed Oct. 12, 2005.
Spanos, G. et al., "Performance Study of a Selective Encryption Scheme for the Security of Networked, Real-Time Video", Proceedings of the Fourth International Conference on Computer Communications and Networks, ICCCN '95, Las Vegas, NV, Sep. 1995, pp. 2-10.
Supplementary European Search Report for European Patent Application No. 00986215 dated Nov. 14, 2005.
Supplementary European Search Report for European Patent Application No. 04757582.4 mailed Nov. 20, 2006.
Teixeira, L. M. et al., "Secure Transmission of MPEG Video Source", Proceedings of IEEE Workshop on ISPACS, Nov. 6, 1998, pp. 1-5.
Wu, T.-L. et al., "Selective Encryption and Watermarking of MPEG Video (Extended Abstract)", submitted to International Conference on Image Science, Systems, and Technology, Feb. 17, 1997, 10 pages.
Yoshida, K, et al., "A Continuous-Media Communication Method for Minimizing Playback Interruptions", IS&T/SPIE Conference on Visual Communications and Image Processing, San Jose, California, vol. 3653, Jan. 1999, 10 pages.

(56) References Cited

OTHER PUBLICATIONS

Zhang, J. et al., "A Flexible Content Protection System for Media-On-Demand", Proceedings of the Fourth International Symposium on Multimedia Software Engineering 2002, Dec. 11-13, 2002, Piscataway, NJ, Dec. 11, 2002, pp. 272-277.

Colwell, A., "Proposal for a MediaSource API that allows sending media data to a HTMLMediaElement," Jul. 11, 2011, pp. 1-11 http://lists.whatwg.org/pipermail/whatwg-whatwg.org/2011-July/032384.html.

Official Communication for U.S. Appl. No. 13/437,789 mailed Nov. 13, 2013.

Official Communication for U.S. Appl. No. 13/532,734 mailed. Oct. 23, 2013.

Official Communication for U.S. Appl. No. 13/654,271 mailed Oct. 24, 2013.

Official Communication for U.S. Appl. No. 13/654,237 mailed Oct. 23, 2013.

Official Communication for U.S. Appl. No. 13/712,764 mailed Nov. 7, 2013.

"A new approach to browser security: the Google Chrome Sandbox," Chromium Blog, http://blog.chromium.org/2008/10/new-approach-to-browser-security-google.html, 5 pages, Oct. 2, 2008.

"Conditional access," Wikipedia, the free encyclopedia, http://en.wikipedia.org/wiki/Conditional_access, 8 pages, created Jul. 7, 2005.

"Encrypted Media Extensions, W3C Editor's Draft Dec. 17, 2012," W3C, http://dvcs.w3.org/hg/html-media/raw-file/tip/encrypted-media/encrypted-media.html, 32 pages, created Feb. 22, 2012, current draft dated Dec. 17, 2012.

"Getting Started: Background and Basics—The Chromium Projects," http://chromium.org/nativeclient/getting-started/getting-started-background-and-basics, 4 pages, Sep. 2, 2008.

"Google Native Client," Wikipedia, the free encyclopedia, http://en.wikipedia.org/wiki/Google_Native_Client, 6 pages, created Dec. 9, 2008.

"HTML5," Wikipedia, the free encyclopedia, http://en.wikipedia.org/wiki/HTML5, 9 pages, created Nov. 16, 2006.

"Media Source Extensions, W3C Editor's Draft Dec. 18, 2012," http://dvcs.w3.org/hg/html-media/raw-file/tip/media-source/media-source.html, 25 pages, created Jul. 11, 2011, current draft dated Dec. 18, 2012.

"Media Source Extensions," http://html5-mediasource-api.googlecode.com/svn/trunk/draft-spec/mediasource-draft-spec.html, 1 page, Jul. 11, 2011.

"MediaSource Extensions v0.3," editor A. Colwell, http://html5-mediasource-api.googlecode.com/svn/tags/0.3/drafts-spec/mediasource-draft-spec.html, 14 pages, Mar. 13, 2012.

"Multimedia over Coax Alliance," Wikipedia, the free encyclopedia, http://en.wikipedia.org/wiki/Multimedia_over_Coax_Alliance, 4 pages, created Jun. 11, 2006.

"Sandbox—The Chromium Projects," http://dev.chromium.org/developers/design-documents/sandbox, 8 pages, Sep. 2, 2008.

"W3C HTML Working Group," http://www.w3.org/html/wg, 9 pages, May 9, 2007.

"Web Cryptography Working Group Charter," W3C Technology and Society domain, http://www.w3.org/2011/11/webcryptography-charter.html, 6 pages, Apr. 3, 2012.

Barth, A. et al., "The Security Architecture of the Chromium Browser," Technical Report, Stanford University, 2008.

Glazkov, D., "What the Heck is Shadow DOM?," http://glazkov.com/2011/01/14/what-the-heck-is-shadow-dom, 14 pages, Jan. 14, 2011.

Metz, C., "Google Native Client: The web of the future—or the past?" The Register, http://www.theregister.co.uk/2011/09/12/google_native_client_from_all_sides/print.html, 13 pages, Sep. 12, 2011.

Yee, B. et al., "Native Client: A Sandbox for Portable, Untrusted x86 Native Code," IEEE Symposium on Security and Privacy, Oakland 2009, 15 pages, May 16-19, 2009.

Official Communication for U.S. Appl. No. 13/437,789 mailed Aug. 14, 2013.

Official Communication for U.S. Appl. No. 13/586,664, mailed Jun. 20, 2013.

Official Communication for U.S. Appl. No. 13/437,789 mailed Mar. 26, 2013.

Official Communication for U.S. Appl. No. 13/586,664 mailed Dec. 26, 2013.

Notice of Allowance dated Feb. 12, 2014 in U.S. Appl. No. 13/437,789.

Notice of Allowance dated Apr. 10, 2015 in U.S. Appl. No. 13/586,664.

Office Action dated Sep. 3, 2014 in U.S. Appl. No. 13/586,664.

* cited by examiner

DYNAMICALLY CHANGING STREAM QUALITY WHEN USER IS UNLIKELY TO NOTICE TO CONSERVE RESOURCES

CROSS-REFERENCE TO RELATED APPLICATION

This application is a utility patent application based on previously filed U.S. Provisional Patent Application Ser. No. 61/569,755 filed on Dec. 12, 2011, the benefit of which is hereby claimed under 35 U.S.C. §119(e) and incorporated herein by reference.

TECHNICAL FIELD

The present embodiments relate generally to managing computing resources and, more particularly, but not exclusively, to selectively increase or decrease at least a quality, display, and/or audio/video features for a content stream when a user is unlikely to notice such changes, such as when the user might not be looking at or listening to the content.

BACKGROUND

Today, personal computers are ubiquitous. Merely take a look around a café, street corner, in a bus, plane, or train, and one will see many people using their smart phones, or other handheld devices. While often these devices are used to communicate messages, they are also used to play video and/or audio content.

Downloading, decrypting, decoding, and displaying of video and/or audio content tend to use higher than average power and resources and therefore, often drains/consumes the batteries, processing cycles, and bandwidth for the handheld device. This might be of particular concern when the handheld computing devices are disconnected from an external power source or may already be running low on power.

While a desire to conserve the energy of a handheld device may be apparent for devices with limited energy reserves, there is also a desire by many to conserve energy consumption for other computing devices that are not typically mobile. This may arise because of an awareness of a cost of energy, and a desire to "think green" and conserve their energy consumption. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present embodiments, reference will be made to the following Detailed Description, which is to be read in association with the accompanying drawings, in which.

DETAILED DESCRIPTION

Figure 1:
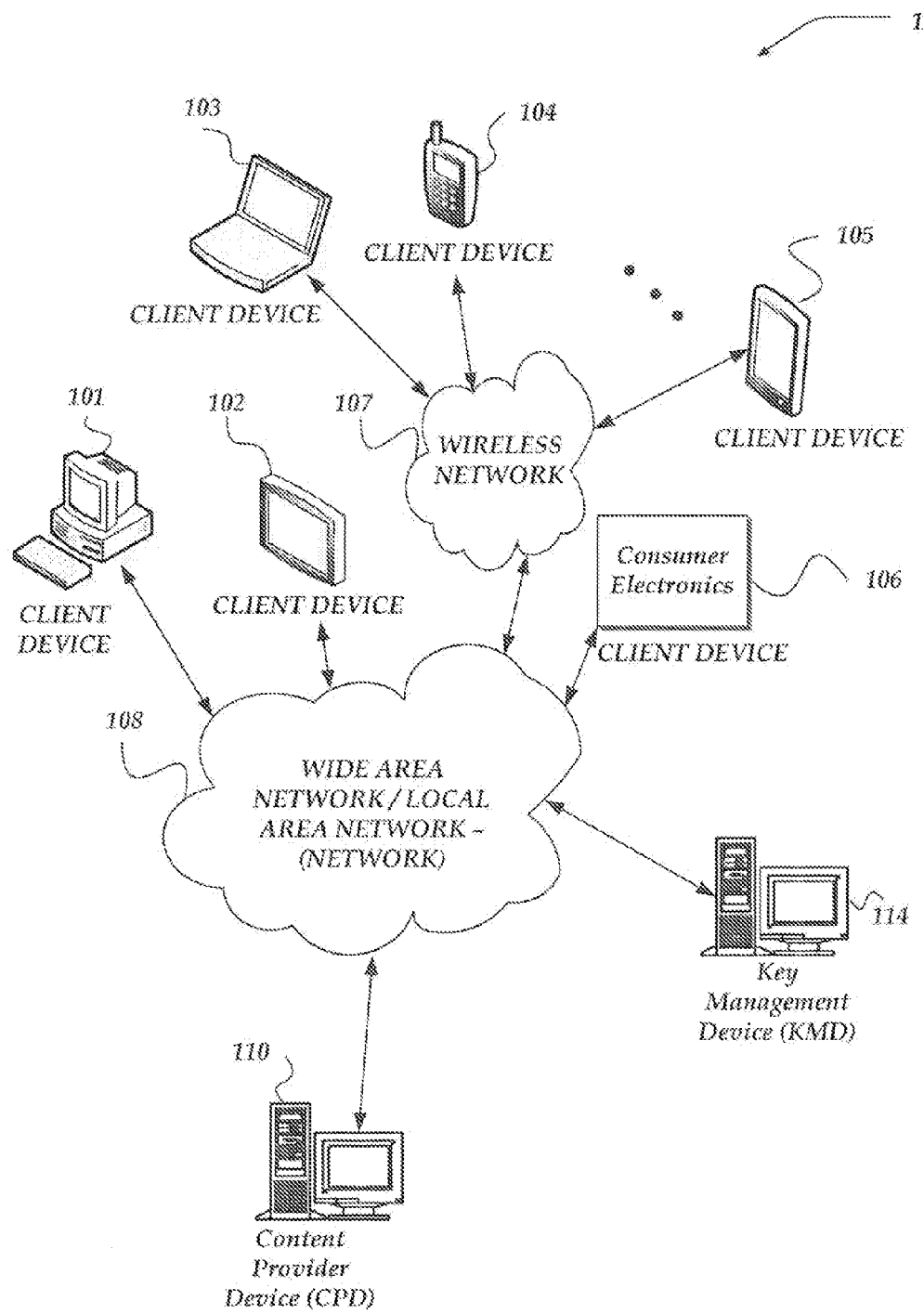
FIG. 1 illustrates a system diagram of one embodiment of an environment in which the embodiments may be practiced.

The present embodiments now will be described more fully hereinafter with reference to the accompanying drawings, which form a part hereof, and which show, by way of illustration, specific aspects in which the embodiments may be practiced. These embodiments may, however, take many different forms and should not be construed as limited to the embodiments set forth herein; rather, these embodiments are provided so that this disclosure will be thorough and complete, and will fully convey the scope to those, skilled in the art. Among other things, the present embodiments may include methods or devices. Accordingly, the present embodiments may take the form of entirely hardware or a combination of software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "content" includes any digital data that may be communicated over a network to be remotely played by a computing device. Non-exhaustive examples of content include but are not limited to movies, videos, music, spoken word, pictures, illustrations, graphics, images, text, and the like. Content is often described by its format, or container, in which the content is provided. Thus, as used here, the term "container" refers to a data stream or file format which encapsulates audio and visual content. This content often consists of interleaved audio and video data in frames, or slices, with accompanying metadata such as frame timing information, audio and/or video configuration information, encoding information, compression information, and the like. Also, the container is typically arranged to enable content to be presented for playback at a remotely located network device, such as a client device. A container may also be named a "systems stream". A non-limiting and non-exhaustive list of examples of container/system streams formats are: MPEG2-TS (Moving Picture Experts Group ("MPEG") transport stream ("TS")), flash video ("FLV"), MOV (a QuickTime file format), MP4, 3GP, and ASF (Advanced Systems Form), WebM Project file format, Matroska multimedia container format, or the like. A video encoding format, such as H.264, VP8, or the like, may be encapsulated in the container. The content may be distributed as a rights managed systems stream of data over a network such as Pay per View (PPV), Video On Demand (VoD), live streaming, or the like for playback by a remote network device. In one embodiment, the content may be protected through a license that describes how, where, when, by whom, or so forth, content that is protected may be accessed, distributed, copied, or the like. Protected content may be protected using a variety of content protection mechanisms.

As used herein, the term "streaming digital content" refers to digital content constantly received by and prepared for presentation for play at a client device while being delivered by a provider, typically over a network such as the Internet. With streaming, the client device can start playing the digital content before the entire content stream has been transmitted/received at the client device.

Further, as used herein, the term "at least one content stream" indicates that one or more streams of the content may be included. In one embodiment, a single content stream may be referenced by this term. However, in another embodiment, several streams may be referenced. In one embodiment, the at least one content stream may be composed of a plurality of content streams, that may be arranged as layers or sub-streams. For example, one layer or sub-stream might be referred to as a base layer or sub-stream having a subset of the content, or the content configured with a decreased quality, over another layer or sub-stream in the plurality of streams. A combination of the layers or sub-streams might be created that progressively increases a quality of the content, as described in more detail below in conjunction with FIG. 5.

As used herein, encryption refers to the process of transforming digital content (referred to as plaintext) using an algorithm (called a cipher) to make it unreadable to anyone except those possessing special knowledge, usually referred to as a key. Decryption is the process of converting encrypted digital content back into its original form. As used herein, "unencrypted" digital content refers to digital content received in plaintext—or that is otherwise not encrypted, and therefore does not need to be decrypted. It should be understood such plaintext digital content, may be received, in at least one embodiment, in a compressed form, or encoded form, and still be considered as plaintext for the purposes described herein. Moreover, as discussed further below, digital content may include portions that are encrypted, and other portions that are unencrypted within a same stream of digital content. Further, different encrypted portions of the stream of digital content may be encrypted using different encryption keys, and/or employ different licenses. In one embodiment, keys useable for decrypting the differently encrypted digital content may be rotated, reused, or renegotiated.

As used herein, the term "quality" of content (or quality of play of content) refers to at least one of a spatial resolution, temporal resolution, a video feature, an audio feature, a bit rate, or a dimensional feature that affects how the content is played, including any one or more of how it is displayed, sounds, or otherwise is visually and/or audibly perceived. For example, a spatial feature may include a picture size or scalability feature of the content. That is video components of the content may be coded based on a selected spatial resolution to provide less or more resolution. Similarly, a temporal or frame rate quality affects such features, for example, as motion compensation dependencies with the content. Changing from a higher level or lower level of quality therefore refers to selecting content having a different (either higher or lower) level of quality than a currently selected level of quality. For example, a higher level of quality might refer to content having a higher level of resolution, compared to other content having a lower level of resolution. Resolution, is merely an example, and is not intended to constrain the usage of the terms, quality, and higher/lower level of quality.

As used herein, the term "automatically," refers to actions performed by a computing device based on one or more decisions performed by the computing device, without an input from a user to directly initiate the action.

It is to be appreciated that in accordance with one or more implementations described in this disclosure, users can opt-in or opt-out of providing personal information, location information, proprietary information, sensitive information, or the like, in connection with any data aspects. Moreover, one or more implementations described herein can provide for anonymizing data.

The following briefly provides a simplified summary of the subject innovations in order to provide a basic understanding of some aspects. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, subject innovations are directed towards selectively and automatically increasing or decreasing at least a quality, display, and/or audio feature for a content stream when a user is unlikely to notice such changes, such as when the user might not be looking or listening to the content, or when the perceived change is otherwise considered more acceptable than it might normally be. A plurality of sensors, flags, and/or input devices are employed to determine whether a user of a computing device is looking at, touching, and/or otherwise consuming the content in some detectable manner. When the user requests play of a stream of content, a determination may be made regarding a level of presence of the user. For example, a camera, motion sensor, touch sensor, proximity detector, accelerometer, or the like, may provide inputs to the computing device that may then be used to determine the level of presence of the user. Further, a configuration of the computing device may also be determined, such as whether the computing device is currently plugged into an Alternating Current (AC) or other power source, whether the computing device is obtaining the content stream from a wired or wireless mobile or non-mobile connection, or based on a variety of other parameters useable to define a configuration of the computing device.

In still other embodiments, a determination may be made whether an application playing content, such as a browser, media player, or the like, is active or inactive within a display screen, whether the application is being rendered within the display screen, or is, for example, behind another window. Further, determinations may be made whether the application playing content includes an active tab displaying the content, or whether the tab for the content is inactive, or hidden.

It should be noted that as used herein, "levels of presence" refer to an amount of detectable interaction with a computing device and/or content stream by at least a user. Thus, for example, a determination may be made based on various inputs indicating that the user is actively watching the content/computing device (e.g., facing a display screen and/or an application window rendering the content is in the foreground); and listening to the content (e.g., a threshold decibel of external sounds is not detected). This might constitute a highest level of presence. A lowest level of presence might arise where, for example, the user is no longer within proximity of the client device, and is unlikely to be listening to the audio, such as when external sounds might be detected, speakers are not connected, or volume is muted or low. Various other factors may then be combined to progressively increase/decrease a level of presence of the user. Moreover, where multiple persons are within proximity of the client device a combination or weighing of factors from each of the persons might be used to determine a level of presence for the user. In one embodiment, a highest level of presence of the multiple persons might be selected.

A level of quality may then be selected based on the determined level of presence and configuration. At least one content stream may then be prepared and played using the selected level of quality. While the at least one content stream is played, monitoring for a change in a level of presence of the user or configuration is performed. During play, when a change in the level of presence or configuration is detected, a different quality of the content is selected, and replaces the currently playing content. In one embodiment, the at least one stream of content may comprise a plurality of substreams, sometimes called layers, where each substream within the at least one stream may comprise a different level of quality. For example, in one embodiment, one substream in the plurality of substreams may be unencrypted, and have a lowest level of resolution, bit rate, or other quality feature. Other substreams in the plurality may be encrypted, and have varying levels of increasing quality. For example, in one embodiment, the lowest level of quality in a plurality of substreams might not include B-frames in a video stream of content. As an aside, encoders may use forward/backward interpolated prediction in encoding video frames. These frames are commonly referred to as bi-directional interpolated prediction frames, or B frames for short. Other types of frames include intra (I) frames (that can be reconstructed without reference to other frames) and inter frames such as P frames that are forward predicted frames from a last reference frame, such as a last I-frame or P-frame.

In one embodiment, the plurality of substreams may be configured using a scalable video coding feature, such as Annex G extension of the H.264/MPEG-4 AVC video compression standard. Using the approach a scalable CODEC may be employed to receive the plurality of substreams, and based on a determined level of presence/configuration, select one or more substreams in the plurality of substreams. The scalable CODEC may then combine the one or more substreams to produce a stream of content at a determined level of quality. In one embodiment, the lowest level of quality substream might be unencrypted. However, in another embodiment, each of the substreams in the plurality of substreams is encrypted.

In one embodiment, the switching between substreams of content within the at least one stream of content may be performed without a visible or readily detected audio delay during swapping between substreams. This may be achieved for example, where negotiations for keys, licenses and the like, is performed previously, or while continuing to play a previous stream of content before swapping between streams. In another embodiment, dynamically changing between streams of content with different levels of quality may incur some delay while a key/license is renegotiated or the new stream can be downloaded.

By changing the quality of the at least one content stream, display and/or audio features based on the level of presence of the user, it is expected that computing resources might be conserved. For example, by changing of a quality of the content stream to say, a lower bitrate, resolution, or the like, it is expected that network bandwidth, central processing unit (CPU) resources, memory, power consumption, and/or other aspects of the computing device and/or network interface might be conserved. Consider for example, where it is determined that the user is no longer viewing a display of the streaming content, or is conversing with another person, or might even have left the physical presence of the computing device. In at least these circumstances, the audio aspect of the content stream might be reduced, the video display of the content stream might be grayed to reduce color usage, or dimmed or otherwise reduced in quality, put to sleep, put into standby mode, or even turned off. Similarly, where the computing device has connected a number of displays, a plurality of speakers, or other output devices, one or more of these output devices may be turned off, and/or otherwise consolidated. For example, where multiple output displays are being used, to conserve resources, displayed material might be repositioned and/or displayed on a single display output device. In another embodiment, at least some of the displayed material might no longer be displayed. Similarly, where the computing device might have both speakers and a headset in use, the audio device that is determined to be consuming more power might be turned off. Moreover, any one or more of these features may be user selectable/configurable. Other variations are also envisaged. Thus, it should be understood that embodiments described herein are not limited or otherwise constrained by these examples.

When it is detected that the user has again changed their level of presence, say by now viewing or otherwise listening to the content stream, the quality and/or physical features of the computing device may then be selectively and automatically increased. Similarly, where the user has unplugged the computing device from a power source, or has removed external speakers or display devices, the quality of the content stream may change to optimize consumption of the computing resources for the user. However, it should be understood that the innovations herein are not constrained to merely optimizing computing resources, as other benefits also exist. For example, various embodiments may also be used for a service's business reasons. For example, an Internet radio site may timeout and request a user to click a button or the like to avoid paying for music the user might not be listening to, but is playing. When a user is present to listen, various embodiments might enable the client device to automate or semi-automate the process and avoid prompting the user or timing out, to avoid annoying the user, and/or avoid costs to the service or user, or even be configured to automatically pay for the content. Other business benefits may include not using unnecessary download bandwidth from a content service provider's server, or the like.

Moreover, in at least one embodiment, a transition period (or detent period) might be employed before decreasing a quality, display, and/or audio feature for the at least one content stream. In this manner, for example, flickering of the display, increasing/decreasing volume, or the quality of the content played is unlikely to occur merely when the user's presence level is reduced for a short time or by one factor or under a threshold level, such when the user turns their head away and then looks back to the computing device.

It is noted that the above are merely some possible examples of various actions that may be taken, however. They are not to be construed as exhaustive or otherwise limiting in scope what actions may be taken, or what criteria may be used to determine an action.

To enhance privacy and user control, in some embodiments, a user may be provided one or more interfaces that enable them to opt-in, or opt-out of use of various features. For example, a user may initially select to opt-in (or opt-out) to enabling any or all of the features described herein. A user may select or otherwise configure one or more sensors, flags, or other monitoring devices, to monitor their one or more aspects of their presence and/or configuration of their computing system, and to perform one or more actions to conserve computing resources. A user may be permitted to select which actions might be taken to conserve resources, including, but not limited to changing displays, audio features, content quality, or the like. For example, the user might configure their system to enable listening to a video, when they step away from the display, even though the user is not watching the video, or any of a variety of other actions. Thus, whether or not data is monitored, and/or used to modify a configuration of the user's system may, in some embodiments, be configurable by the user. Moreover, in other embodiments, any data collected about the user and/or their configuration may be made anonymous. However, in some embodiments, the data may be collected and/or provided to the user to enable the user to assess how to change their configuration, and/or selections to improve conservation of their resources.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 108, wireless network 107, client devices 101-106, Content Provider Device ("CPD") 110, and Key Management Device (KMD) 114.

One embodiment of client devices 101-106 is described in more detail below in conjunction with FIG. 2. In one embodiment, at least some of client devices 101-106 may operate over a wired and/or a wireless network such networks 107 and 108. As shown, client device 101 may include virtually any computing device capable of communicating over a network to send and receive information, including instant messages, performing various online activities, or the like. The set of such devices may include devices that typically connect using a wired or wireless communications medium such as personal computers, multiprocessor systems, microprocessor-based or programmable consumer electronics, network PCs, or the like. Also, client device 102 may include virtually any device usable as a video display device, such as a television, display monitor, display screen, projected screen, and the like. Additionally, client device 106 may include any kind of Electronic device, e.g., a Blu-ray player, DVD player, CD player, portable music playing device, portable display projector, and the like. Moreover, client devices 101-106 may provide access to various computing applications, including a browser, or other web-based application.

Generally, however, client devices 101-106 may include virtually any portable computing device capable of receiving and sending messages over a network, accessing and/or playing content, such as network 108, wireless network 107, or the like. Further, client devices 103-105 may include virtually any portable computing device capable of connecting to another computing device and receiving information such as, laptop computer 103, smart phone 104, and tablet computers 105, and the like. However, portable computer devices are not so limited and may also include other portable devices such as cellular telephones, display pagers, radio frequency ("RF") devices, infrared ("IR") devices, Personal Digital Assistants ("PDAs"), handheld computers, wearable computers, integrated devices combining one or more of the preceding devices, and the like. As such, client devices 101-106 typically range widely in terms of capabilities and features.

In one embodiment, client devices 101-106 may include one or more sensors, cameras, or the like that may be used to determine a level of presence of a user of the client device. Such sensors may include, but are not limited to accelerometers, touch sensors, motion sensors, proximity detectors, device connection, and the like. Sensors may also be wearable by a user of the client device and be configured to operate though one or more different wireless interfaces with the client device. In one embodiment, sensors may also be located external around a proximity of the client device and/or user, such as on a chair, desk, wall, floor, mobile phone, or the like, rather than merely being wearable by the user. Thus; a variety of sensors and/or sensor locations may be employed to detect and monitor a level of presence of the user.

A web-enabled client device may include a browser application that is configured to receive and to send web pages, web-based messages, and the like. The browser application may be configured to receive and display graphics, text, multimedia, media content, and the like, employing virtually any Internet based and/or network-based protocol, including but not limited to a wireless application protocol messages ("WAP"), Hypertext Transfer Protocol ("HTTP"), or the like. In one embodiment, the browser application is enabled to employ Handheld Device Markup Language ("HDML"), Wireless Markup Language ("WML"), WMLScript, JavaScript, Standard Generalized Markup Language ("SGML"), Hyper Text Markup Language ("HTML"), eXtensible Markup Language ("XML"), and the like, to display and send a message. In one embodiment, a user of a client device may employ the browser application to perform various activities over a network (online). However, another application may also be used to perform various online activities.

Client devices 101-106 also may include at least one other client application that is configured to receive and/or send content between another computing device. The client application may include a capability to send and/or receive content, or the like. The client application may further provide information that identifies itself, including a type, capability, name, and the like. In one embodiment, client devices 101-106 may identify themselves as part of a class of devices. In another embodiment, client devices 101-106 may uniquely identify themselves through any of a variety of mechanisms, including a phone number, Mobile Identification Number ("MIN"), an electronic serial number ("ESN"), Internet Protocol (IP) Address, network address, or other mobile device identifier. The information may also indicate a content format that the mobile device is enabled to employ. Such information may be provided in a network packet, or the like, sent between other client devices, CPD 110, or other computing devices. Moreover, it should be readily understood that devices and/or components within a device that is communicating with a client device may also identify themselves using any of a variety of mechanisms, including those used by the client device.

Client devices 101-106 may further be configured to include a client application that enables an end-user to log into an end-user account that may be managed by another computing device, such as CPD 110, or the like. Such end-user account, in one non-limiting example, may be configured to enable the end-user to manage one or more online activities, including in one non-limiting example, search activities, social networking activities, browse various websites, communicate with other users, or the like. In one embodiment, the end-user's client device may receive content streamed to the client device for play at the client device. However, participation in online activities may also be performed without logging into the end-user account.

Wireless network 107 is configured to couple client devices 103-105 and its components with network 108. Wireless network 107 may include any of a variety of wireless sub-networks that may further overlay stand-alone ad-hoc networks, and the like, to provide an infrastructure-oriented connection for client devices 101-106. Such sub-networks may include mesh networks, Wireless LAN ("WLAN") networks, cellular networks, and the like. In one embodiment, the system may include more than one wireless network.

Wireless network 107 may further include an autonomous system of terminals, gateways, routers, and the like connected by wireless radio links, and the like. These connectors may be configured to move freely and randomly and organize themselves arbitrarily, such that the topology of wireless network 107 may change rapidly.

Wireless network 107 may further employ a plurality of access technologies including 2nd (2G), 3rd (3G), 4th (4G) generation radio access for cellular systems, WLAN, Wireless Router ("WR") mesh, and the like. Access technologies such as 2G, 3G, 4G and future access networks may enable wide area coverage for mobile devices, such as client devices 101-106 with various degrees of mobility. In one non-limiting example, wireless network 107 may enable a radio connection through a radio network access such as Global System for Mobil communication ("GSM"), General Packet Radio Services ("GPRS"), Enhanced Data GSM Environment ("EDGE"), Wideband Code Division Multiple Access ("WCDMA"), and the like. In essence, wireless network 107 may include virtually any wireless communication mechanism by which information may travel between client devices 103-106 and another computing device, network, and the like.

Network 108 is configured to couple network devices with other computing devices, including, CPD 110, and through wireless network 107 to client devices 103-105. Network 108 is enabled to employ any form of network mechanism for communicating information from one electronic device to another. Also, network 108 can include the Internet in addition to LANs, WANs, direct connections, such as through a universal serial bus ("USB") port, other forms of network mechanism, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computing devices.

Additionally, network mechanisms by way of example, network mechanisms include wired media such as twisted pair, coaxial cable, fiber optics, wave guides, and other wired media and wireless media such as acoustic, RF, infrared, and other wireless media.

One embodiment of CPD 110 is described in more detail below in conjunction with FIG. 3. Briefly, however, CPD 110 includes virtually any network device usable to operate as a content server to connect to network 108 to provide content to client devices 101-106. In some embodiments, CPD 110 may provide at least one stream of digital content to a client device. In one embodiment, at least some portions of the at least one stream may be encrypted, while at least some other portions of the at least one stream may be unencrypted. As discussed further below, in one embodiment, the at least one steam includes at least two streams (sub-streams, or layers) of digital content—a first stream that is unencrypted, and a second stream that is encrypted, both streams having the same digital content. In one embodiment, the unencrypted stream may be encoded at a lower quality level, a lower resolution, or even a lower bit rate than the encrypted stream. In another embodiment, CPD 110 may provide a plurality of substreams using a scalable video coding approach. In one embodiment, CPD 110 may employ an Annex G extension of the H.264/MPEG-4 AVC video compression standard, or the like. In one embodiment, different substreams within the plurality of sub-streams may be encoded with differing levels of complexity and then later be combined to provide different levels of quality of playable content, such as is described in more detail below in conjunction with FIG. 5. Similarly, encryption can be performed using varying levels of complexity.

It should be readily recognized that CPD 110 is configured to operate on behalf of a content owner, distributor, or similar business entity. However, while used herein to represent such network devices useable to provide content, it is further recognized that other devices may also be employed. For example, a content provider may employ a Content Distribution Network Device (not shown) that operates on behalf of the content provider to provide content. Thus, other configurations and variations of devices serving content are also envisaged, and other embodiments are not constrained to a single configuration/arrangement of devices.

Devices that may operate as CPD 110 include various network devices, including, but not limited to personal computers, desktop computers, multiprocessor systems, microprocessor-based or programmable consumer electronics, network PCs, server devices, network appliances, and the like.

Although FIG. 1 illustrates CPD 110 as a single computing device, the invention is not so limited. For example, one or more functions of CPD 110 may be distributed across one or more distinct network devices. Moreover, CPD 110 is not limited to a particular configuration. Thus, in one embodiment, CPD 110 may contain a plurality of network devices to provide content, licenses, and/or decryption keys to a client device, such as client devices 101-106. Similarly, in another embodiment, CPD 110 may contain a plurality of network devices that operate using a master/slave approach, where one of the plurality of network devices of CPD 110 operates to manage and/or otherwise coordinate operations of the other network devices. In other embodiments, the CPD 110 may operate as a plurality of network devices within a cluster architecture, a peer-to-peer architecture, and/or even within a cloud architecture. Thus, the invention is not to be construed as being limited to a single environment, and other configurations, and architectures are also envisaged.

In one embodiment, CPD 110 may also be configured to manage license requests, and/or access to decryption keys useable to decrypt portions of the encrypted digital content by a client device for play based on the license.

It should be noted that the encrypted content may be encrypted using any of a variety of symmetric and/or asymmetric key technologies. For example, possible asymmetric keys technologies include, but are not limited to, Diffie-Hellman, RSA, Merkle-Hellman, PGP, X.509, elliptic curve techniques, ElGamal, or the like. Similarly, various possible symmetric key technologies include, but are not limited to, Twofish, Serpent, AES (Rijndael), Blowfish, CAST5, RC4, 3DES, and IDEA, to name just a few. Moreover, the content may be protected using a combination of symmetric and asymmetric key technologies. For example, a symmetric content decryption key might be used to encrypt/decrypt the content, and an asymmetric key technology might be used to encrypt/decrypt the content decryption key.

KMD 114 represents one of a variety of network devices for managing access to symmetric and/or asymmetric keys. In one embodiment, KMD 114 may operate to certify an ownership of a public key named within a digital certificate that provides a public key, where the public key is part of a public/private key associated with any of a variety of asymmetric key technologies. This allows others, such as CPD 110, or the like, to rely upon signatures or assertions made by the owner that corresponds to the public key that is certified. In one embodiment, KMD 114 may then operate as a trusted third party. Thus, in one embodiment, KMD 114 may operate as a Certification Authority, such as employed by many public key infrastructures (PKI) schemes. Further, KMD 114 may also provide Certificate Revocation Lists (CRLs) indicating when a public key/certificate is no longer valid, and might no longer be trusted/trustable.

In one embodiment, KMD 114 may receive a public key from a content provider, or the like, and based on various criteria, elect to make accessible the public key through a certificate that KMD 114 digitally signs. In one embodiment, access to the public key may enable an authorized client device to decrypt a content key that may then be used to decrypt at least a portion of the encrypted content.

In one embodiment, KMD 114 or CPD 110 might operate to negotiate a license and/or access to a key with client devices 101-106. In one embodiment, different content decryption keys might be used to encrypt different portions of a provided content. Thus, in one embodiment, multiple key negotiations may be performed for a given at least one content stream.

It should be understood, that while KMD 114 is illustrated as a separate device from CPD 110, in other embodiments, the functions of these devices may be integrated.

Although FIG. 1 illustrates KMD 114 as single computing devices, the invention is not so limited. For example, one or more functions of KMD 114 may be distributed across one or more distinct network devices. Moreover, KMD 114 is not limited to a particular configuration. Thus, in one embodiment, KMD 114 may contain a plurality of network devices. Similarly, in another embodiment, KMD 114 may contain a plurality of network devices that operate using a master/slave approach, where one of the plurality of network devices operates to manage and/or otherwise coordinate operations of the other network devices. In other embodiments, the KMD 114 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
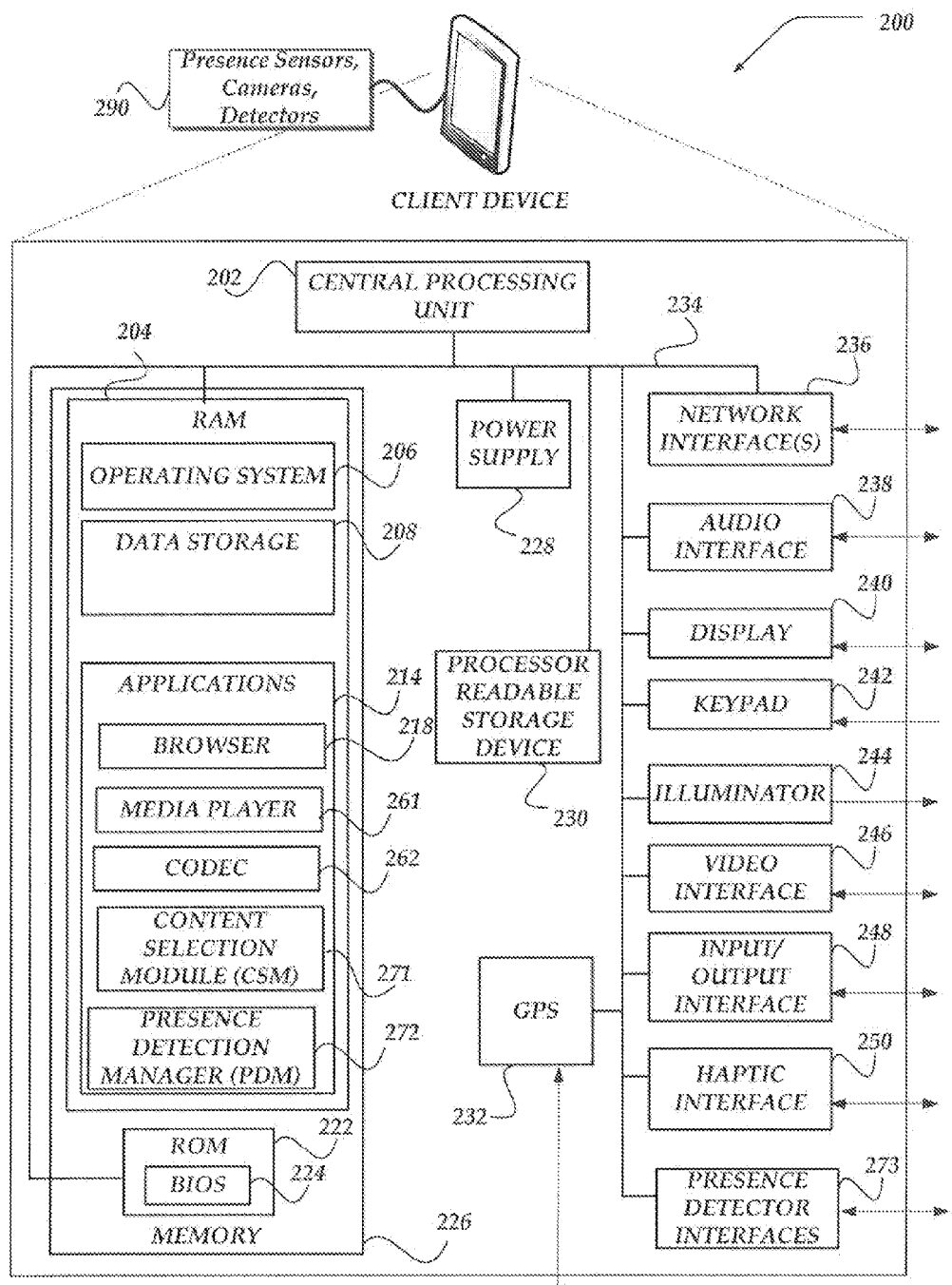
FIG. 2 illustrates one possible embodiment of a client device usable within the environment of FIG. 1.

FIG. 2 shows one embodiment of client device 200 that may be included in a system implementing the invention. Client device 200 may represent any of a variety of platforms useable to perform actions as disclosed within. Client device 200 may include many more or less components than those shown in FIG. 2. However, the components shown are sufficient to disclose an illustrative embodiment for practicing the present invention. Client device 200 may represent, for example, one embodiment of at least one of client devices 101-106 of FIG. 1.

As shown in the figure, client device 200 includes a central processing unit ("CPU") 202 in communication with a mass memory 226 via a bus 234. Client device 200 also includes a power supply 228, one or more network interfaces 236, an audio interface 238, a display 240, a keypad 242, an illuminator 244, a video interface 246, an input/output interface 248, a haptic interface 250, a global positioning systems ("GPS") receiver 232, and presence detector interfaces 273.

Power supply 228 provides power to client device 200. A rechargeable or non-rechargeable battery may be used to provide power. The power may also be provided by an external power source, such as an alternating current ("AC") adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, GSM, code division multiple access ("CDMA"), time division multiple access ("TDMA"), user datagram protocol ("UDP"), transmission control protocol/Internet protocol ("TCP/IP"), Short Message Service ("SMS"), GPRS, WAP, ultra wide band ("UWB"), Institute of Electrical and Electronics Engineers ("IEEE") 802.16 Worldwide Interoperability for Microwave Access ("WiMax"), session initiated protocol/real-time transport protocol ("SIP/RTP"), or any of a variety of other wired and/or wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be an LCD, gas plasma, light emitting diode ("LED"), or any other type of display used with a computing device. Display 240 may also include a touch sensitive screen arranged to receive input from an object such as a stylus or a digit from a human hand.

Moreover, display 240 may be configured to employ any of a variety of network connection types, including, but not limited to High-Bandwidth Digital Content Protection (HDCP) connection types, Display Port (DP), Digital Visual Interface (DVI), and High-Definition Multimedia Interface (HDMI), as well as Gigabit Video Interface (GVIF), Standard-definition (SD), Unified Display Interface (UDI), or Intel Wireless Display (WiDi). At least some of these network connection types provide a form of digital copy protection. A detection of whether display 240 is connected through one of these, or other types, of network connection types may be determined using a variety of techniques, including signature transmissions, protocol handshakes, authentication procedures, or the like. Changing usage of a network connection type may indicate a change in the configuration of at least one component of client device 200.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensor's may include a complementary metal-oxide-semiconductor ("CMOS") integrated circuit, charge-coupled device ("CCD"), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like. Haptic interface 250 is arranged to provide tactile feedback to a user of the client device. For example, the haptic interface 250 may be employed to vibrate client device 200 in a particular way when another user of a computing device is calling.

GPS transceiver 232 can determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control ("MAC") address, IP address, or the like.

Presence detector interfaces 273 operate to receive various signals from one or more presence sensors, cameras, detectors, or the like, such as block 290 represents. Presence detector interfaces 273 may include wireless and/or wired interfaces that receive signals and provides the signals to Presence Detection Manager 272 for use in determining a level of presence of a user of client device 200. It should be noted that while presence detector interfaces 273 represents one possible mechanism for receiving signals useable to detect a presence of the user, other interfaces may also be used, including interfaces to a mouse, keyboard, camera, display, speakers, headphones, or the like. Similarly, GPS 232 may also provide signals to Presence Detection Manager 272, as well of any of a variety of other mechanisms. Further, although not illustrated, accelerometers, and/or other components within, and/or otherwise connected to client device 200 may also provide input signals to Presence Detection Manager 272.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store messages, web page content, or any of a variety of user generated content. At least a portion of the information may also be stored on another component of network device 200, including, but not limited to computer readable storage device 230, a disk drive or other computer-readable storage device (not shown) within client device 200.

In some embodiments, data storage 208 may act as a buffer for content received from CPD 110 of FIG. 1. As noted above, it is recognized that providing of such content may also be performed by another device on behalf of CPD 110 of FIG. 1.

Applications 214 may include computer executable instructions which, when executed by client device 200, transmit, receive, and/or otherwise process messages (e.g., SMS, Multimedia Message Service ("MMS"), instant messages ("IM"), email, and/or other messages), audio, video, and enable telecommunication with another user of another client device. Other examples of application programs include calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 214 may include, for example, browser 218, media player 261, Content Selection Module 271, Coder/Decoder (CODEC) 262 (also sometimes referred to as Compressor/Decompressor), and Presence Detection Manager (PDM) 272.

Browser 218 may include virtually any application configured to receive and display graphics, text, multimedia, and the like, employing virtually any web based protocol. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client device 200 to provide and/or receive content from another computing device, such as CPD 110 of FIG. 1. Although browser 218 is described herein, it should be noted that there are a plurality of other applications that may operate as a user agent configured to request and/or access content. Thus, other user agents may also be included within client device 200.

Media player 261 represents any of a variety of software and/or hardware configurations arranged to receive and play various content. As such, in one embodiment, media player 261 may also represent a hardware component that might be installed within client device 200 and/or coupled electrically to client device 200 to enable client device 200 to access and play content.

PDM 272 represents any of a variety of software and/or hardware arranged to receive a plurality of presence signals and to determine a level of presence of at least the user of the client device. PDM 272 may combine one or more signals to determine the level of presence, and/or a change in the level of presence. Moreover, PDM 272 may also receive information from various components of client device 200 useable to determine a configuration of client device 200 as well as a change in the configuration. For example, PDM 272 might receive configuration status from operating system 206 indicating whether client device is connected or disconnected from an external power source; whether a battery or other internal power source is at a threshold value indicating full charge, loss of power, or the like. Similarly, PDM 272 might receive information indicating whether some other characteristic of client device 200 is changed, including for example, a CPU frequency or number of active cores; changes from a wired network, a secure network, or even a wireless connection; a change in a volume selection; a change in a display system; change from speakers (internal or external); a change to/from headphones; a change where the display is dimmed or goes to sleep; or any of a variety of other changes to client device 200's configuration. PDM 272 may then provide information to CSM 271 indicating a level of presence, a change in a level of presence, and/or a configuration or change in a configuration.

CSM 271 represents any of a variety of software and/or hardware configurations arranged to receive at least one stream of digital content, where the received at least one stream of content has a plurality of different levels of defined quality of content. CSM 271 may receive information about a detected level of presence/change in configuration from PDM 272. Then, using the level of presence/configuration, CSM 271 may select a level (or a change in the level) of quality of the content for play. In one embodiment, CSM 271 may further negotiate one or more licenses, and/or decryption keys usable to decrypt and enable play of the at least one stream of content at the determined level of quality. In one embodiment, some of the received at least one stream of content may be unencrypted. For example, as discussed further below, a substream of the content having a lower level of quality than another substream, may be unencrypted, such that at least some of the content might be decoded/decompressed and readied to play more quickly than other content that might need licenses/keys obtained and be decrypted prior to being decoded/decompressed and readied for play. In still another embodiment, CSM 271 may, for any of a variety of reasons, select not to change the quality of the content in response to additional information received by another source, such as a server, or the like.

CSM 271 may manage changes to the level of quality of the content by enabling a transition between quality changes in a manner that is directed towards minimizing disruptions of the play of the content during the transitions. For example, where the quality of the content is to be increased, the change may be made such that a start of play of the content at the higher quality is arranged to occur at a position in the content that coincides with a position currently playing in the content. Further, when decreasing a quality of content, CSM 271 and/or PDM 272 may delay transition 'downwards' in quality for a defined time period. This may be performed so as not to result in dithering or otherwise flip/flopping, between two or more different quality levels, merely based on frequent changes in a level of presence and/or configuration changes. For example, if a user is merely picking up a pencil, or otherwise looking towards another person during play of the content, it might not make sense to immediately transition to a lower display level of the content, especially where the user then turns back to the display after a few moments. Thus, to avoid dithering, a detent, lag, or timer might be implemented to minimize such affects.

In any event, CSM 271 may provide some of the content to media player 261 for play based on the selected level of quality. In one embodiment, media player 261 might receive some of the content in a coded or compressed form. Media player 261 may then employ CODEC 262 to decode and/or decompress the received portion of content stream such that the content is readied for play virtually as soon as it is received.

Further, CSM 271 and/or PDM 272 may employ a process such as disclosed below in conjunction with FIG. 4 to perform at least some of its actions.

It should be noted that while CSM 271 is disclosed above as providing various actions based on a detected level of presence/configuration from PDM 272, in another embodiment, PDM 272 may also perform at least some of these actions, including, but not limited to selecting the level of quality, display, audio features, and/or other features of client device 200. Moreover, in one embodiment, PDM 272 may be integrated within CSM 271.

CODEC 262 includes any of a variety of compression/decompression mechanisms configured to receive compressed content and decompress the content into a format capable of being rendered for the user's enjoyment. For example, CODEC 262 may employ Moving Pictures Experts Group (MPEG), Joint Photographic Experts Group (JPEG), wavelets, and/or any other mechanism that compresses content that may later be decompressed. Further, although CODEC 262 may include capabilities for graphical content, CODEC 262 may also be configured to receive audio content, and as appropriate, prepare the audio content for play by a media player as well. Thus, CODEC 262 may not be exclusive for graphical content, and may also operate on audio, graphical content, and/or content having a combination of audio and graphical information.

In one embodiment, CODEC 262 may also be configured to receive scalable video coding content that is encoded in a plurality of substreams. In one embodiment, the subset video bitstreams (substreams) may be derived by dropping packets from a larger video to reduce a bandwidth for one of the subset bitstreams. The subset bitstreams, described further below in conjunction with FIG. 5 may represent a lower spatial resolution (smaller screen), lower temporal resolution (lower frame rate), lower quality/less data (e.g., at a same resolution), or the like. CODEC 262 may receive various substreams, including a baseline profile substream, and one or more higher quality profile substreams. CODEC 262 may then combine the substreams to produce for play a single stream of content that has a level of quality at the highest substream employed in the combination.

Illustrative Network Device

Figure 3:
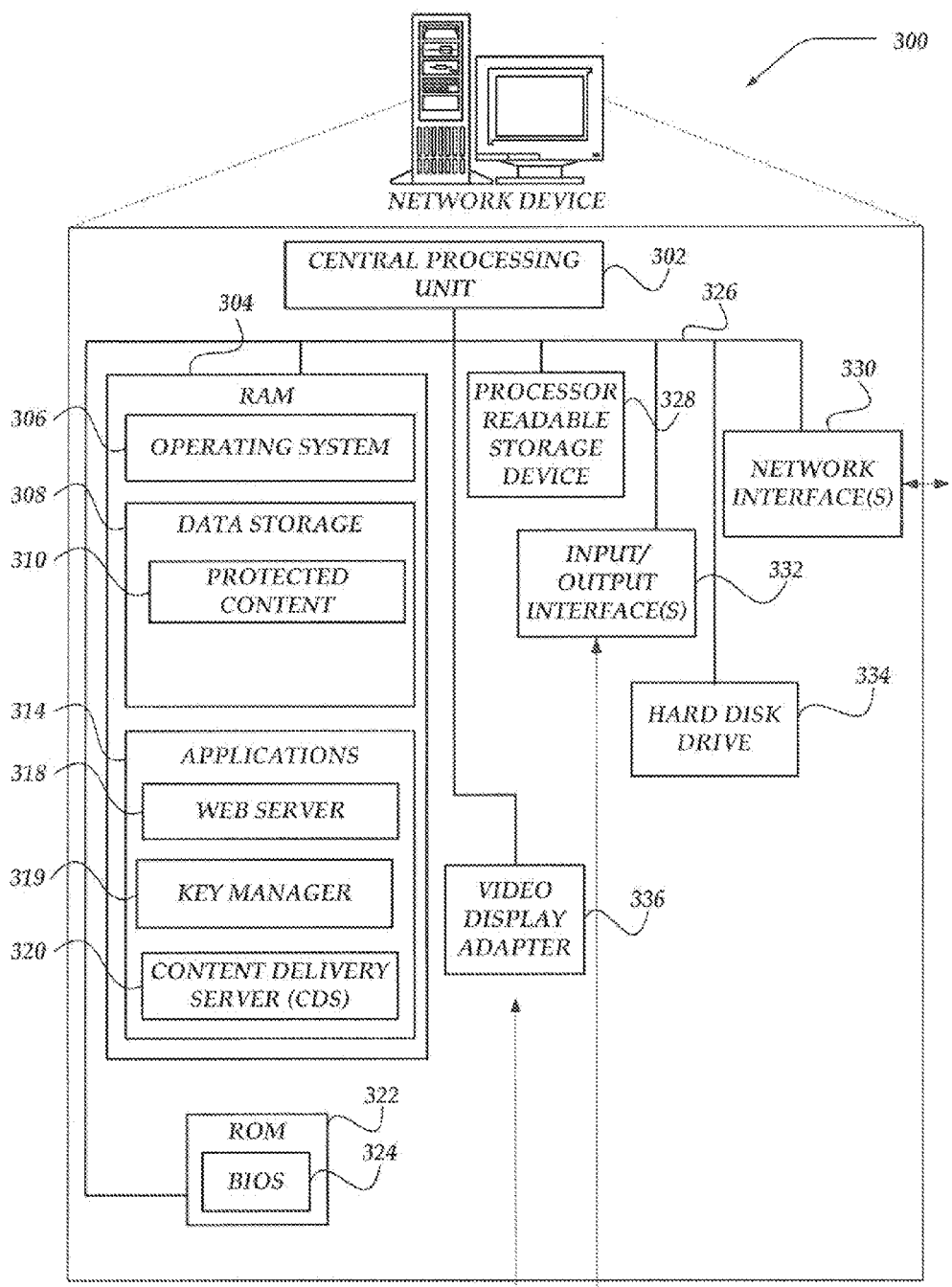
FIG. 3 illustrates one possible embodiment of a network device usable by a content provider within the environment of FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, a client, a peer, a host, or any other device. Network device 300 may represent, for example CPD 110 of FIG. 1.

Network device 300 includes central processing unit 302, computer readable storage device 328, network interface unit 330, an input/output interface 332, hard disk drive 334, video display adapter 336, and a mass memory, all in communication with each other via bus 326. The mass memory generally includes RAM 304, ROM 322 and one or more permanent (non-transitory) mass storage devices, such as hard disk drive 334, tape drive, optical drive, and/or floppy disk drive. The mass memory stores operating system 306 for controlling the operation of network device 300. Any general-purpose operating system may be employed. BIOS 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer-readable media, namely computer-readable storage media and/or processor-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical media which can be used to store the desired information and which can be accessed by a computing device.

As shown, data storage 308 may include a database, text, spreadsheet, folder, file, or the like, that may be configured to maintain and store user account identifiers, user profiles, email addresses, IM addresses, and/or other network addresses, or the like. Data storage 308 may further include program code, data, algorithms, and the like, for use by a processor, such as central processing unit 302 to execute and perform actions. In one embodiment, at least some of data storage 308 might also be stored on another component of network device 300, including, but not limited to computer readable storage device 328, hard disk drive 334, or the like.

Data storage 308 may further store streams of protected content 310. Streams of protected content 310 represent any of a variety of content that may be protected from access using a license, encryption, and/or the like. In some embodiments, streams of protected content 310 may include a plurality of available versions of content. In one embodiment, the available versions may include one or more video tracks and/or one or more one or more audio tracks. In some embodiments, each video track may be in a different video quality, or the like. In other embodiments, each audio track may be in a different audio quality or the like. Various non-limiting, non-exhaustive examples of streams of protected content 310 are described in more detail below in conjunction with FIG. 5.

The mass memory also stores program code and data. One or more applications 314 are loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Web server 318, key manager 319, and content delivery server 320, may also be included as application programs within applications 314.

Web server 318 represent any of a variety of services that are configured to provide content, including messages, over a network to another computing device. Thus, web server 318 includes, for example, a web server, an FTP server, a database server, a content server, or the like. Web server 318 may provide the content including messages over the network using any of a variety of formats including, but not limited to WAP, HDML, WML, SGML, HTML, XML, Compact HTML ("cHTML"), Extensible HTML ("xHTML"), or the like. Web Server 318 may also be configured to enable a user of a client device, such as client devices 101-106 of FIG. 1, to browse content, such as streams of protected content 310, and select content for display/play on the client device.

Key manager 319 is configured to manage negotiations of decryption keys and/or licenses for content streams. In one embodiment, key manager 319 may provide decryption keys and/or licenses to KMD 114 of FIG. 1. In other embodiments, key manager 319 may perform negotiations directly with a client device. In one embodiment, key manager 319 may select one or more content decryption keys for use in encrypting different portions of a content stream.

Key manager 319 may also be configured to revoke a license, and/or invalidate one or more decryption keys, based, for example, on an unauthorized request for a license, key, or even based on receiving an indication that an integrity of a requesting client device is determined to be compromised.

Content Delivery Server (CDS) 320 is configured to manage access to streams of protected content 310. In one embodiment, the content may be protected through a license or licenses. In another embodiment, the content may be protected by being encrypted. In one embodiment, one portion of content may be encrypted using a first content encryption key; while another portion of the content may be encrypted using a second content encryption key. Thus, to decrypt the protected content, a user's client device may need access to a license that indicates how, where, and/or when the protected content may be accessed. The user's client device may also need access to one or more decryption keys usable to decrypt various portions of the protected content. In one embodiment, where multiple encryption keys are used to encrypt the content, a key rotation scheme may be employed, where the client device is provided an indication that the content is encrypted using a different key, and that the client device will have to use the different key. However, in another embodiment, the content may be protected by a license(s) and not be encrypted using encryption key(s).

Moreover, in at least one embodiment, network device 300 may be configured to provide to a client device, such as shown in FIGS. 1-2, a content selection module (CSM) 271 and/or PDM 272. For example, during an initial registration with a content provider device, such as CPD 110 of FIG. 1, or the like, network device 300 may provide for download, or any other form of access, CSM 271, PDM 272, and/or other components. The receiving client device may then install for execution such components for use with various embodiments described herein.

General Operation

The operation of certain aspects of various embodiments will now be described with respect to FIG. 4. FIG. 4 illustrates a flow chart of one embodiment of a process 400 usable to dynamically change a quality, display, and/or audio feature of a stream of content playing within a client device, when a change in a level of presence of a user of the client device is detected and/or a configuration of the client device is detected.

As noted elsewhere, such changes are directed at being performed when the user is unlikely to notice the differences, and are performed with the intent of at least conserving resources, although other benefits may also arise, and therefore, innovations are not limited by a particular benefit. Thus, when the user is detected, for example, as not looking at a display of the content, a quality of the content and/or display of the content may be decreased. When the user thereafter looks at the display for the content, a change that increases the quality of the content's display features might be performed instantaneously, so as to minimize disruptions in an enjoyment of the content. However, to avoid dithering of the quality of the played content, transitions towards a decreased quality of the content might include a detent, lag, or delay before the transition is implemented. Then, if during that period of time before decreasing the quality, should the level of presence again change—say, upwards, then the decrease might not be implemented. In this manner, frequent jumps between different levels of quality may be avoided.

Figure 4:
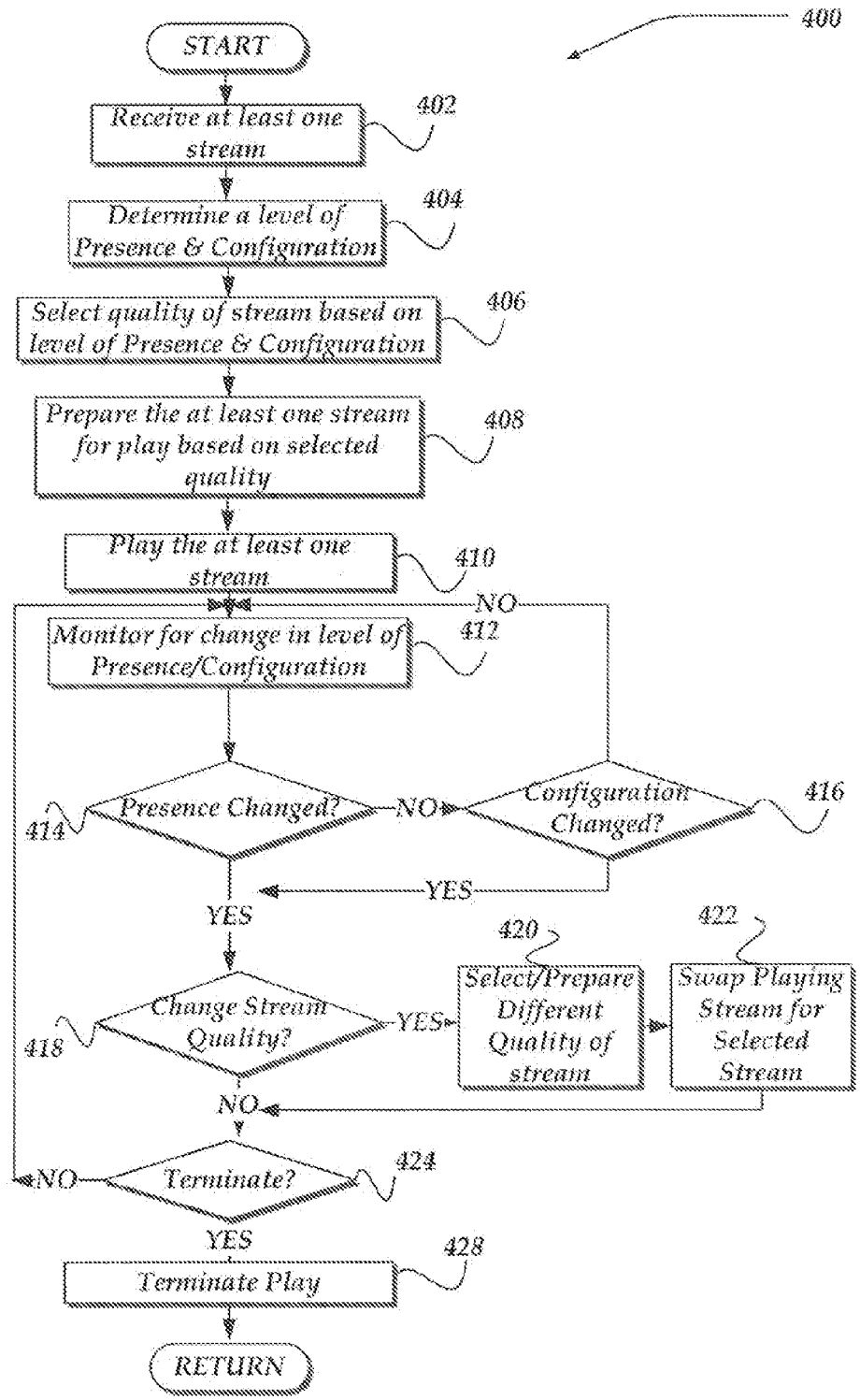
FIG. 4 illustrates a flow chart of one embodiment of a process usable to dynamically change a quality, display, and/or audio feature of a stream of content playing within a client device, in part when a change in a level of presence of a user of the client device is detected.

Process 400 of FIG. 4 may be performed within a client device, such as client devices 101-106 of FIG. 1, or client device 200 of FIG. 2. In one embodiment, process 400 is provided as computer-executable instructions for execution within a client device, using, for example, CSM 271 and/or PDM 272 of FIG. 2.

In any event, a client device may send a request for digital content to be streamed to the client device. In one embodiment, the digital content may streamed over a network to the client device. As such, process 400 may begin, after a start block, wherein at least one stream of content is received at the client device (platform). Continuing next, process 400 flows to block 404, where a level of presence is determined for a user of the client device.

In one embodiment, a variety of signals may be weighted and/or combined and evaluated to determine the level of presence. It is to be appreciated that in accordance with one or more implementations described in this disclosure, users can opt-in or opt-out of providing personal information, demographic information, location information, proprietary information, sensitive information, or the like in connection with various aspects described herein. Moreover, one or more implementations described herein can provide for anonymization of one or more types of data. Furthermore, one or more implementations described herein can provide measures, such as security measures, that prevent the data analyzed to determine a level of presence from being transmitted or used outside a particular device. In one embodiment, a level of presence may be based on receiving signals that indicate that a user is facing the client device, and is currently not talking or otherwise actively involved in a conversation (such as listening on a telephone) with someone else. In one embodiment, other sounds within proximity of the client device might be received and analyzed to conclude that the user is or is not attentive to the content being streamed on the client device. In one embodiment, sensor inputs might be used to conclude that the user is facing the client device, is sitting in front of the client device, turned away from the client device, or merely near the client device but not otherwise facing the screen of the client device.

A variety of other sensor inputs may also be used to determine a level of presence of the user. Based on the analysis, it may be determined that the user is actively involved in the client device, for the content stream, or in some level not 'present.' For example, a user might be determined to be physically present before the client device, but not watching and/or listening to the device. In other examples, analysis of active and/or inactive tabs, ribbons, or the like, in a browser or other application might indicate whether the user is actively involved in the content. For example, the tab or application that is actively being displayed in the user's display might be different from the tab associated with rendering or otherwise providing the content to the user. A combination of one or more characteristics of the user may then be used to determine a level of presence for the user.

It should be noted that in at least one scenario, more than one person might be within a defined proximity of the client device. In this situation, analysis may be performed to identify a highest level of presence for the plurality of persons. That is, even if only one person is determined to be actively watching the client device's screen, while other persons might not be, the level of presence may be determined to indicate that the user(s) are actively watching the client device's screen. By taking the highest level of presence of a group of persons, the quality of the content displayed will then be optimized for the highest level of presence.

At block 404, a configuration of the client device is also determined. As noted above, a variety of inputs may be used to determine a configuration. For example, inputs about a power source, a screen display currently being used, an audio source, as well a plurality of other features may be used to determine a configuration of the client device. Selection of which features to monitor may be based, at least in part, with the goal of managing consumption of resources, such as power, by the client device.

Processing flows next block 406, where a level of quality of the at least one stream of content is selected based on the detected level of presence and the determined configuration. For example, it might be determined initially that the client device is detected at a level of presence indicating that the user(s) is neither listening to, nor watching the display screen. This might indicate a low level of presence, which may then result in a low level of quality being selected or even changes to the client configuration. For example, the selected content corresponding to this low level of quality might have a lowest acceptable resolution, bit rate, or the like, for the content, where acceptable might refer to an ability, for example, to view or hear some of the content, but, the content is grainy, has low audio quality, or the like. In one embodiment, the audio volume might further be lowered. In another embodiment, the display might be put to sleep.

Similarly, if the client device is currently configured with a wireless or mobile connection, having low bandwidth, and a small display screen, then the level of quality of the at least one stream of the content might be selected at a low level of quality. For example, the selection might include a level of quality that has a reduced resolution of display, reduced bitrate, and might employ less complex decryption, decoding, or the like of the content, than a configuration that might have a wired connection, having a high bandwidth, a large display screen, or the like.

In one embodiment, a combination of the level of presence and the configuration is used to determine the level of quality of the at least one stream of the content. In another embodiment, the level of presence and the configuration might be weighed and a lowest (or highest) resulting level of quality is then selected based on a comparison of the weighed factors (e.g., presence and configuration).

In any event, processing flows next to block 408, where based on the selected level of quality for the content, the content is prepared for play. In one embodiment, a license/keys might be negotiated to enable access and/or decryption of at least some of the at least one stream of the content for the selected level of quality. Further, combining of substreams, decoding/decompressing or the like, may be performed on the received at least one stream at the level of quality.

Flowing next to block 410, the readied portion of the at least one stream of content is played at the client device at the selected level of quality. Process 400 flows next to block 412.

At block 412, similar to block 404, monitoring is performed to detect a change in the level of presence for the user and/or a change in the configuration. It should be noted that while block 412 is illustrated within a sequence of blocks, block 412 could be executed continuously and/or external to process 400. In any event, block 412 is performed at least while content is being played. This is done to detect changes of presence and/or configuration dynamically, and make changes in the played content's quality as appropriate. In one embodiment, block 412 is performed periodically, such as on a timer.

As discussed elsewhere, changes in a configuration might include any of a variety of changes, including, but not limited to a device being disconnected from external power, a change in display device, an audio device, a power source, or the like.

In any event, processing flows to decision block 414, where a determination is made whether the level of presence is changed from a current level of presence (e.g., the level of presence for the currently playing content). For example, the user might have been facing away from the screen at block 404 and has now turned towards the screen. As another example, a user might have been viewing a different browser tab or application window and has now selected to view the browser tab or application window playing the content. Other presence indicators may also have changed. In any event, if the level of presence is determined to have changed, processing flows to decision block 418; otherwise, processing flows to decision block 416.

At decision block 416, a determination is made whether a configuration change is detected. If a configuration change is detected processing flows to decision block 418; otherwise processing may loop back to block 412 to continue monitoring for a change in the level of presence and/or configuration.

At decision block 418, a determination is made whether to change the quality of the playing stream quality based on the change in the level of presence and/or change in configuration. For any of a variety of reasons, process 400 might determine not to change the level of quality. For example, it might be determined not to change the current level of quality when the level of presence of the user has changed from not watching or listening to the content stream to physically leaving the proximity of the client device, and it is determined that the current level of quality is already at a lowest level of quality. In this situation, the level of quality might not be able to change further. Other examples are also valid.

Further, in at least one embodiment, a detent, lag, or transition delay timer may be implemented that might defer a change at least downwards in quality, e.g., to minimize dithering of the content between different levels of quality. In any case, if it is determined that the quality of the stream is to change, then processing flows to block 420; otherwise, processing flows to decision block 424.

At block 420, a different level of available quality of the at least one stream of content is then selected and prepared for play. If the currently playing level of quality is a lowest/highest possible for the content stream, then, no other lower/higher level is available, and in one embodiment, the currently playing level is the same as the newly selected quality level.

The content may be prepared for play by performing various actions including: changing keys, changing licenses, decrypting the content, decoding the content, or performing other related actions on the content stream as appropriate. In one embodiment, during preparation of the changed level of quality content stream, the currently playing content may be allowed to continue to play.

Moving to block 422, when the newly prepared content stream is ready for play, the content may be synchronized to start play at a position consistent with where the current content is being played. In this manner, the transition from the currently playing at least one content stream to the prepared and readied at least one content stream at a changed quality may appear to be seamless (other than a possible detectable quality difference). Processing then flows to decision block 424.

At decision block 424, a determination is made whether to continue to play the currently playing at least one content stream. If not, processing flows to block 428 where playing of the content is terminated. Processing then returns to another process. Otherwise, if the content is to continue to play, processing loops back to block 412.

Thus, as can be seen, the above is directed to dynamically changing the stream quality to match a current level of presence of the user and a configuration of the client device. This is performed to maintain a best level of user experience consistent with the level of presence and configuration. Moreover, as noted, such changes may occur, at least downwards when the user is unlikely to notice the difference and in a manner that is directed to optimizing consumption of resources.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system, a cloud system, a multi-server system, or the like. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions.

Non-Limiting, Non-Exhaustive Examples of Digital Content Streams

Figure 5:
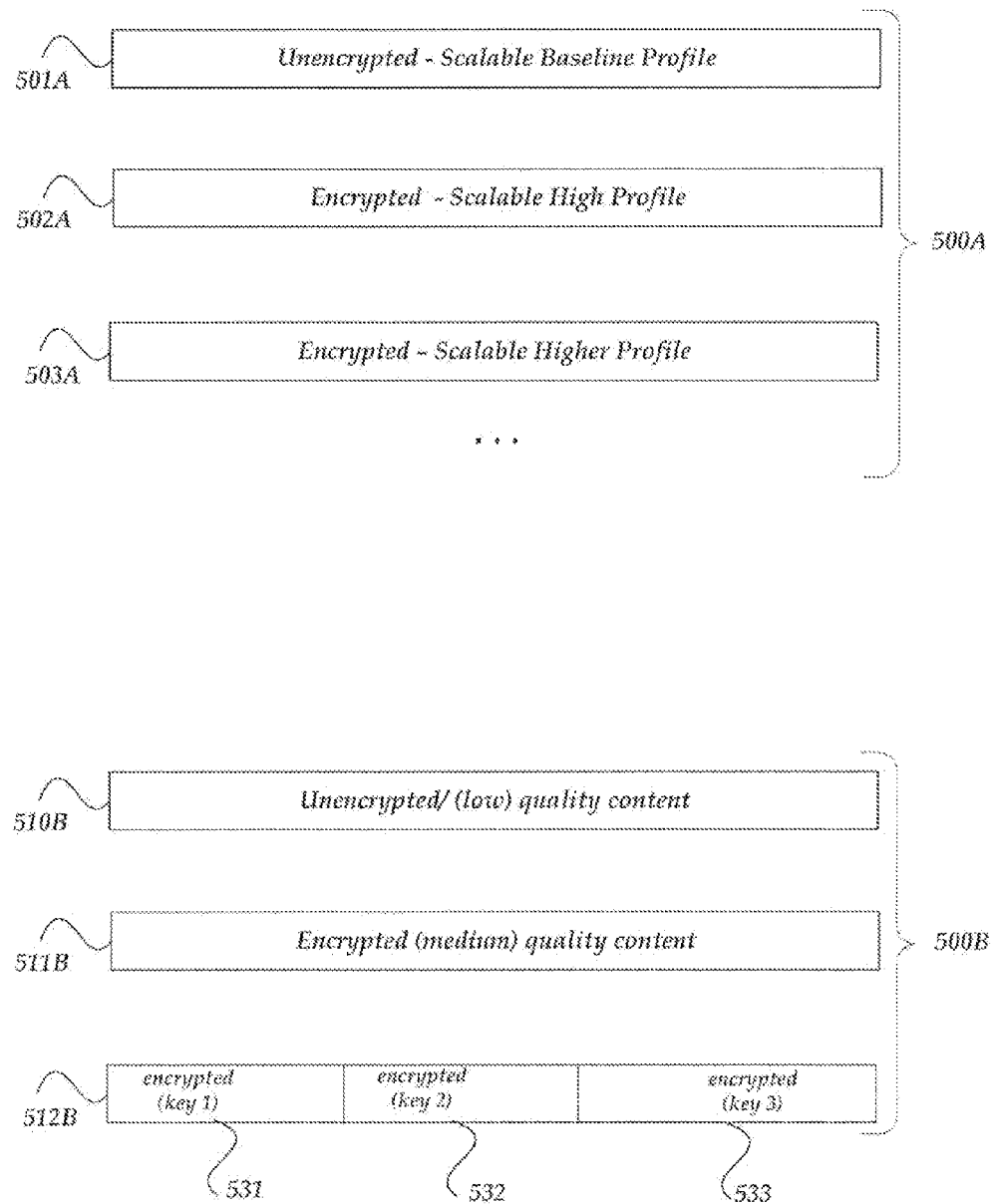
FIG. 5 illustrates non-limiting, non-exhaustive examples of possible embodiments of at least one stream of content usable in dynamically changing stream quality, display, and/or audio features.

FIG. 5 illustrates non-limiting, non-exhaustive examples of possible embodiments of at least one stream of content usable in dynamically changing stream quality of protected content. It should be understood that the provided at least one stream of content, 500A and 500B are merely examples, and that the innovations described herein are not constrained by these examples. Moreover, it should be understood that the at least one stream of content 500A and 500B represent having the same content, just different based on a quality feature.

As shown, the at least one stream of content 500A includes substreams 501A-503A, sometimes called layers, where each substream may be combined with another substream to vary a quality of the content of the at least one stream that is played. In one embodiment, substreams 501A-503A may represent content configured using a scalable video coding compression codec. However, audio components may also be scaled in a similar manner. In any event, in one embodiment, at least one substream may provide a scalable baseline profile for the stream of content 500A. In one embodiment, the substream 501A might be unencrypted to enable a time to play a first frame of the content to be reduced. That is, a time to play a first frame might be reduced by removing decryption and key/license acquisition actions in readying the content for play. However, in another embodiment, substream 501A may be encrypted.

In one embodiment, the substream 501A might be considered to have a lowest level of quality for the substreams 501A-503A. By combining each of the substreams, a progressively higher level of quality may be obtained, until combining all of the substreams provides a highest level of quality for the at least one stream of content 500A.

The at least one stream of content 500B is illustrated as comprising three streams, 510-B-512B. It should be recognized that more or less streams may be employed, and thus embodiments are not limited to three streams within the at least one stream of content 500B.

Each stream within the at least one stream of content 500B may be readied and played separate from another stream in the at least one stream of content 500B. That is, unlike the at least one stream of content 500A, where each substream is combined with one or more substreams, below it, to create a stream—except of course for the substream 501A, which may be played without so requiring combining—each stream within the at least one stream of content 500B, may be played without needing to be combined with another stream.

Further, stream 510B may include content that has a lesser quality feature than content within stream 511B or stream 512B. Further, in one embodiment, stream 510B may be unencrypted to enable a fast time to playing a first frame, as discussed above. Stream 512B may be considered as having a highest level of quality of the content over streams 510B or 511B. Further, as shown, in one embodiment, stream 512B may be encrypted using different encryption keys for different portions of the stream. However, it should be understood that stream 511B may also be so encrypted. Further, in one embodiment, the encryption mechanisms or DRM surrounding the keys may also be different between each stream, and/or the keys for each stream may be different between the streams, as well.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A computer-based method operating on a computer device, comprising:
   receiving, from a plurality of sensors associated with the computer device, a plurality of user-configured sensor inputs corresponding to at least a first user and a second user;
   detecting an initial level of presence of a user of the computer device based on the plurality of user-configured sensor inputs, wherein a first level of user presence is determined for the first user and a second level of user presence is determined for the second user;
   selecting a level of quality of content based on the first level of user presence and the second level of user presence; and
   while playing at least one stream of content at the selected level of quality, when at least one of the first level of user presence and the second level of user presence is detected to change from the initial level of user presence, automatically switching play of the at least one stream to another level of quality of content based on the change in the level of user presence.

2. The computer-based method of claim 1, further comprising:
   detecting an initial configuration of the computer device;
   detecting the level of quality of content based further on the detected initial configuration; and
   while playing the at least one stream of content at the selected level of quality, when at least one of the first level of user presence and the second level of user presence is detected to change or the configuration of the computer device is detected to change, automatically switching play of the at least one stream to another available level of quality of content based on the change in the level of user presence or the change in the configuration.

3. The computer-based method of claim 2, wherein detecting a configuration further comprises monitoring a configuration of an operating system, a display device, a speaker output, a device connection, or a network interface.

4. The computer-based method of claim 1, wherein detecting a level of presence of the user further comprises employing at least one of a camera or sensor to receive at least one signal useable to determine whether the user is at least one of facing a display for the computer device or is talking.

5. The computer-based method of claim 1, wherein changing a level of quality of the content further comprises decreasing a quality of the content by at least one of dimming a display of the content, putting to sleep the display, putting into standby the display, reducing a number of output devices in use, or decreasing a volume of the content.

6. The computer-based method of claim 1, wherein when the first level of user presence and the second level of user presence is detected to decrease, switching play of the at least one stream using a decreased level of defined quality of content further comprises using a detent or delay timer prior to switching play, to minimize dithering between levels of quality of content.

7. The computer-based method of claim 1, wherein at least one stream of content comprises a scalable video coding stream that comprises a plurality of subset bitstreams, each bitstream having a different level of defined quality of content than another bitstream in the plurality of subset bitstreams.

8. An apparatus comprising a non-transitory computer readable medium, having computer-executable instructions stored thereon, that in response to execution by a computing device, cause the computing device to perform operations, comprising:
receiving at least one stream of content, the at least one stream of content having a plurality of different levels of defined quality of content;
receiving, from a plurality of sensors associated with the computing device, a plurality of user-configured sensor inputs corresponding to at least a first user and a second user;
detecting a level of presence of a user of the computing device based on the plurality of user-configured sensor inputs, wherein a first level of user presence is determined for the first user and a second level of user presence is determined for the second user;
selecting a level of defined quality of content based on the first level of user presence and the second level of user presence; and
while playing the at least one stream of content at the selected level of defined quality:
when the first level of user presence and the second level of user presence is detected to decrease for the computing device, switching play of the at least one stream using an available decreased level of defined quality of content; and
when at least one of the first level of user presence and the second level of user presence is detected to increase for the computing device, switching play of the at least one stream using an available increased level of defined quality of content.

9. The apparatus of claim 8, wherein performing operations further include:
detecting a configuration of the computing device; and
employing a detected change in the configuration, while playing of the at least one stream of content, to change the level of defined quality of content.

10. The apparatus of claim 9, wherein detecting a change in the configuration of the computing device further comprises detecting a change in at least one of a display device, a speaker, or a network connection for the computing device.

11. The apparatus of claim 8, wherein when the first level of user presence and the second level of user presence is detected to decrease, switching play of the at least one stream using a decreased level of defined quality of content further comprises using a detent or delay timer prior to switching play, to minimize dithering between levels of quality of content.

12. The apparatus of claim 8, wherein the at least one stream of content comprises a plurality of different streams of the content, wherein at least one stream in the plurality has a different level of defined quality of content than at least one other stream in the plurality.

13. The apparatus of claim 8, wherein detecting a level of presence of the user further comprises employing at least one of a camera or sensor to receive at least one signal useable to determine whether the user is at least one of facing a screen display for the computing device or is talking.

14. The apparatus of claim 8, wherein decreasing a quality of the content further includes at least one of dimming a display of the content, putting to sleep the display, putting the display into standby, reducing a number of output devices in use, or decreasing a volume of the content.

15. A client device, comprising:
a network interface to receive content over a network; and
one or more hardware processors, coupled to a memory that stores computer executable instructions that, when executed by the one or more hardware processors, perform actions including:
receiving, from a plurality of sensors associated with the client device, a plurality of user-configured sensor inputs corresponding to at least a first user and a second user;
detecting a level of user presence at the client device based on the plurality of user-configured sensor inputs, wherein a first level of user presence is determined for the first user and a second level of user presence is determined for the second user;
selecting a level of defined quality of content based on the first level of user presence and the second level of user presence; and
while playing at least one stream of content at the selected level of defined quality:
when the first level of user presence and the second level of user presence is detected to decrease, switching play of the at least one stream to a decreased level of defined quality of content; and
when at least one of the first level of user presence and the second level of user presence is detected to increase, switching play of the at least one stream to an available increased level of defined quality of content.

16. The client device of claim 15, wherein the at least one stream of content comprises a plurality of different streams of the content, wherein at least one stream in the plurality has a different level of defined quality of content than at least one other stream in the plurality.

17. The client device of claim 15, wherein performing actions further including:
detecting a configuration of the client device; and
employing a detected change in the configuration, while playing of the at least one stream of content, to change the level of defined quality of content.

18. The client device of claim 15, wherein detecting a level of presence of the user further comprises employing at least one of a camera or sensor to receive at least one signal useable to determine whether the user is at least one of facing a screen display for the client device or is talking.

19. The client device of claim 15, wherein when the first level of user presence and the second level of user presence is detected to decrease, switching play of the at least one stream using a decreased level of defined quality of content further comprises using a detent or delay timer prior to switching play, to minimize dithering between levels of quality of content.

20. The client device of claim 15, wherein decreasing a quality of the content further includes at least one of dimming, putting to sleep, or putting in stand-by a display of the content or decreasing a volume of the content.

* * * * *